(12) United States Patent
Miyamoto et al.

(10) Patent No.: US 11,675,447 B2
(45) Date of Patent: Jun. 13, 2023

(54) ACTIVE PEN

(71) Applicant: Wacom Co., Ltd., Saitama (JP)

(72) Inventors: Masayuki Miyamoto, Saitama (JP);
Takeshi Koike, Saitama (JP); Naoki Watanabe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/730,018

(22) Filed: Apr. 26, 2022

(65) Prior Publication Data

US 2022/0253163 A1    Aug. 11, 2022

Related U.S. Application Data

(63) Continuation of application No. 17/229,368, filed on Apr. 13, 2021, now Pat. No. 11,327,581, which is a continuation of application No. PCT/JP2020/031081, filed on Aug. 18, 2020.

(51) Int. Cl.
  *G06F 3/0354* (2013.01)
  *G06F 3/044* (2006.01)
  *G06F 3/041* (2006.01)
  *G06F 3/038* (2013.01)

(52) U.S. Cl.
  CPC ........ *G06F 3/03545* (2013.01); *G06F 3/0383* (2013.01); *G06F 3/0442* (2019.05); *G06F 3/04162* (2019.05)

(58) Field of Classification Search
  CPC .......... G06F 3/03545; G06F 3/04162
  USPC ....................................................... 345/179
  See application file for complete search history.

(56) References Cited

U.S. PATENT DOCUMENTS

| 8,536,471 B2 | 9/2013 | Stern et al. |
| 2012/0105362 A1 | 5/2012 | Kremin et al. |
| 2017/0308186 A1 | 10/2017 | Yamamoto |
| 2018/0004324 A1 | 1/2018 | Park |
| 2019/0187810 A1 | 6/2019 | Alack, Jr. et al. |
| 2019/0196642 A1* | 6/2019 | Kong ............... G06F 3/041662 |
| 2020/0026369 A1 | 1/2020 | Hisano |
| 2020/0050296 A1* | 2/2020 | Fleck .................... G06F 3/0383 |
| 2020/0401293 A1* | 12/2020 | Wang .................. G06F 3/04162 |

FOREIGN PATENT DOCUMENTS

| CN | 104484063 A | 4/2015 |
| CN | 107209599 A | 9/2017 |
| CN | 110750163 A | 2/2020 |
| CN | 110874154 A | 3/2020 |
| JP | 6059410 B1 | 1/2017 |
| JP | 2017-054544 A | 3/2017 |

(Continued)

OTHER PUBLICATIONS

International Search Report, dated Aug. 18, 2020, for International Application No. PCT/JP2020/031081, 12 pages.

*Primary Examiner* — Koosha Sharifi-Tafreshi
(74) *Attorney, Agent, or Firm* — Seed IP Law Group LLP

(57) ABSTRACT

An active pen includes an integrated circuit that transmits a downlink signal through a first electrode and receives an uplink signal through a second electrode different from the first electrode. The active pen includes a stop filter inserted between the second electrode and the integrated circuit. The integrated circuit, in operation, performs transmission of the downlink signal and the reception of the uplink signal at the same time.

11 Claims, 16 Drawing Sheets

(56) References Cited

FOREIGN PATENT DOCUMENTS

| | | |
|---|---|---|
| JP | 2020-027607 A | 2/2020 |
| JP | 2020-113026 A | 7/2020 |
| KR | 10-2017-0113577 A | 10/2017 |
| KR | 10-2018-0003816 A | 1/2018 |
| WO | 2015/111159 A1 | 7/2015 |
| WO | 2017/029836 A1 | 2/2017 |
| WO | 2020/017477 A1 | 1/2020 |

* cited by examiner

ACTIVE PEN

BACKGROUND OF THE INVENTION

1. Field of the Invention

The present invention relates to an active pen, and particularly, to an active pen that performs both of transmission and reception.

2. Description of the Related Art

There is a known active pen configured to receive an uplink signal transmitted by a sensor controller and to transmit a downlink signal to the sensor controller. Examples of this type of active pen are disclosed in Japanese Patent No. 6059410 (hereinafter referred to as "Patent Document 1").

Various active pens are disclosed in Patent Document 1, and a dual-mode stylus among them is an active pen supportive of both of a first communication method of two-way communication and a second communication method of one-way communication from the active pen to a sensor controller. The dual-mode stylus is configured to operate in the first communication method when the dual-mode stylus receives an uplink signal and operate in the second communication method when the dual-mode stylus detects a pen touch operation without receiving an uplink signal.

Examples of the communication method of the active pen are disclosed in each of International Publication No. WO 2017/029836 (hereinafter referred to as "Patent Document 2"), International Publication No. WO 2015/111159 (hereinafter referred to as "Patent Document 3"), U.S. Pat. No. 8,536,471 (hereinafter referred to as "Patent Document 4"), and U.S. Patent Application Publication No. 2012-0105362 (hereinafter referred to as "Patent Document 5").

The dual-mode stylus described in Patent Document 1 is configured to perform the reception of the uplink signal and the transmission of the downlink signal in a time-division manner. However, when the transmission and the reception are performed in the time-division manner, the uplink signal cannot be received while the downlink signal is transmitted (for example, for a period of approximately 4 msec). As a result, the reception of the uplink signal may be delayed, and the start of the operation in the first communication method may be delayed. Therefore, an improvement is necessary.

SUMMARY OF THE INVENTION

An object of the present invention is to provide an active pen that can prevent a delay in reception of an uplink signal.

A first aspect of the present invention provides an active pen including first and second electrodes provided at different positions, a transmission circuit that uses a booster circuit to cause a change in the first electrode to thereby transmit a downlink signal, a reception circuit that uses the second electrode to detect an uplink signal, and a stop filter that prevents a change in a potential of the first electrode from affecting a potential of the uplink signal detected by the reception circuit.

A second aspect of the present invention provides an active pen including a first operation mode for executing a process of detecting an uplink signal reaching a second electrode while a downlink signal is transmitted from a first electrode, and a second operation mode for performing, in a time-division manner, the transmission of the downlink signal from the first electrode and the detection of the uplink signal reaching the second electrode, in which the active pen shifts to the second operation mode when the uplink signal is detected during an operation in the first operation mode.

According to the first aspect of the present invention, the active pen can perform the reception of the uplink signal and the transmission of the downlink signal at the same time, instead of a time-division manner. Therefore, this can prevent a delay in the reception of the uplink signal.

According to the second aspect of the present invention, the active pen that has not detected the sensor controller yet so that the transmission timing of the uplink signal transmitted by the sensor controller is not recognized can perform the reception of the uplink signal and the transmission of the downlink signal at the same time. On the other hand, the active pen that has detected the uplink signal so that the transmission timing of the uplink signal transmitted by the sensor controller is recognized can perform the reception of the uplink signal and the transmission of the downlink signal in a time-division manner. Therefore, the delay in the reception of the uplink signal can be prevented, and once the uplink signal is detected, the uplink signal with a small amount of noise can be detected.

DETAILED DESCRIPTION OF THE PREFERRED EMBODIMENTS

Preferred embodiments of the present invention will now be described in detail with reference to the attached drawings.

Figure 1:
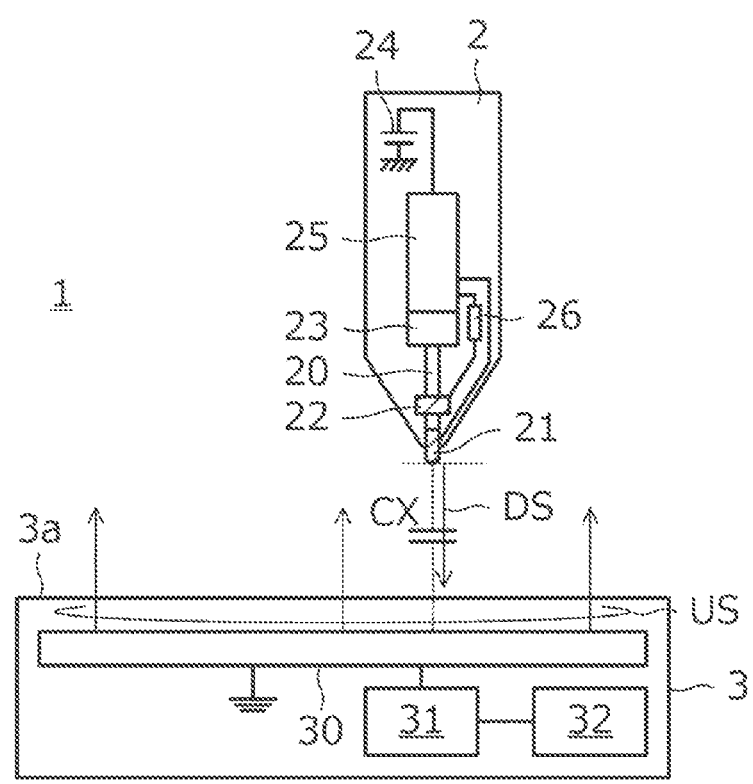
FIG. 1 depicts a configuration of a position detection system according to an embodiment of the present invention.

FIG. 1 depicts a configuration of a position detection system 1 according to an embodiment of the present invention. As illustrated in FIG. 1, the position detection system 1 includes an active pen 2 and an electronic device 3 that is a position detection apparatus configured to detect the active pen 2. Examples of the electronic device 3 include a tablet computer and a device including a digitizer.

The electronic device 3 includes a touch surface 3a, a sensor electrode group 30 arranged just below the touch surface 3a, a sensor controller 31 connected to the sensor electrode group 30, and a host processor 32 that controls each component of the sensor controller 31 including these components. The sensor controller 31 is an integrated circuit with a function of communicating with the active pen 2 through the sensor electrode group 30 to derive the position of the active pen 2 in the touch surface 3a, acquiring data from the active pen 2, and supplying the derived position and the acquired data to the host processor 32 on each occasion. The host processor 32 is a central processing unit of the electronic device 3, and the host processor 32 can execute various programs including a drawing application. The drawing application is a program with a function of generating digital ink based on the position and the data supplied from the sensor controller 31, storing the digital ink in a memory of the electronic device 3, and displaying the digital ink on a display.

Capacitance CX is generated between the active pen 2 and the sensor electrode group 30 when the active pen 2 is near the touch surface 3a. The sensor controller 31 can exchange charge with (form a capacitive bond with) the active pen 2 through the capacitance CX to thereby communicate with the active pen 2.

The active pen 2 is an active capacitive stylus (dual stylus) supportive of both of a first communication method, which is two-way communication, and a second communication method, which is one-way communication from the active pen 2 to the sensor controller 31. The first communication method is, for example, a communication method (AES 2.0 system) described in Patent Document 2, and the second communication method is, for example, a communication method (AES 1.0 system) described in Patent Document 3, a communication method described in Patent Document 4, or a communication method described in Patent Document 5.

Hereinafter, a signal transmitted from the sensor controller 31 to the active pen 2 will be referred to as an uplink signal US, and a signal transmitted from the active pen 2 to the sensor controller 31 will be referred to as a downlink signal DS. The uplink signal US includes a pulse wave (square wave) in which transmission bits are spread by a chip sequence (spreading codes) of a predetermined chip length. The chip length of an uplink signal US1 (=pulse period of uplink signal US1) is, for example, a time period such as 1 and 2 μsec, and the edge period (rising period or falling period) is, for example, 10 nsec. In AES 2.0, the pulse period of the pulse wave after Manchester coding is 2 μsec. On the other hand, the downlink signal DS includes a pulse wave (square wave), or a signal based on a sine wave (the signal includes a sinusoidal signal at a predetermined frequency, and a signal obtained by modulating the sinusoidal signal). Details of the downlink signal DS will be described later.

As illustrated in FIG. 1, the active pen 2 includes a core body 20, a pen tip electrode 21 (first electrode), a ring electrode 22 (second electrode), a pressure sensor 23, a battery 24, an integrated circuit 25, and a stop filter 26. The core body 20 is a member that forms a pen axis of the active pen 2. A front end of the core body 20 provides a pen tip of the active pen 2, and a back end is in contact with the pressure sensor 23. The pen tip electrode 21 and the ring electrode 22 are conductors provided at different positions. The pen tip electrode 21 is arranged at the pen tip of the active pen 2, and the ring electrode 22 is arranged to surround the core body 20, at a position closer to the middle portion of the active pen 2 compared to the pen tip electrode 21.

The pressure sensor 23 is a sensor that detects the pressure applied to the front end of the core body 20. The pressure detected by the pressure sensor 23 is supplied as a pen pressure value to the integrated circuit 25. The battery 24 plays a role of supplying power necessary for the operation of the integrated circuit 25.

The integrated circuit 25 is an integrated circuit including various circuits, such as a booster circuit, a transmission circuit, a reception circuit, and a processing circuit. The transmission circuit is connected to the pen tip electrode 21 and the ring electrode 22, and the transmission circuit plays a role of using the booster circuit to cause a change in the pen tip electrode 21 or the ring electrode 22 to thereby transmit the downlink signal DS. The reception circuit is connected to the ring electrode 22, and the reception circuit plays a role of using the ring electrode 22 to perform a detection operation of the uplink signal US to thereby receive the uplink signal US. The processing circuit generates a downlink signal DS and executes a process of causing the transmission circuit to transmit the generated downlink signal DS. In the case of performing the first communication method, the downlink signal DS is generated based on the uplink signal US received by the reception circuit.

The stop filter 26 is a filter circuit inserted between the ring electrode 22 and the integrated circuit 25. Although the detailed configuration of the stop filter 26 will be described later, the stop filter 26 is a circuit provided to allow the detection of the uplink signal US using the ring electrode 22 and the transmission of the downlink signal DS from the pen tip electrode 21 at the same time.

More specifically, the potential increased by the booster circuit to transmit the downlink signal DS is 18 to 20 V, and the change in the potential of the pen tip electrode 21 associated with the transmission of the downlink signal DS also affects the reception circuit. As a result, the downlink signal DS is superimposed on the potential of the uplink signal US detected by the reception circuit, and it is difficult to detect the uplink signal US at the same time as the transmission of the downlink signal DS. The reception strength of the uplink signal US is low when the active pen 2 is in a hover state, in which the ring electrode 22 is far from the sensor electrode group 30. Therefore, the detection of the uplink signal US becomes more difficult. The stop filter 26 plays a role of preventing the change in the potential of the pen tip electrode 21 associated with the transmission of the downlink signal DS from affecting the potential of the uplink signal US detected by the reception circuit in the integrated circuit 25 to thereby allow the detection of the uplink signal US using the ring electrode 22 and the transmission of the downlink signal DS from the pen tip electrode 21 at the same time.

Figure 2:
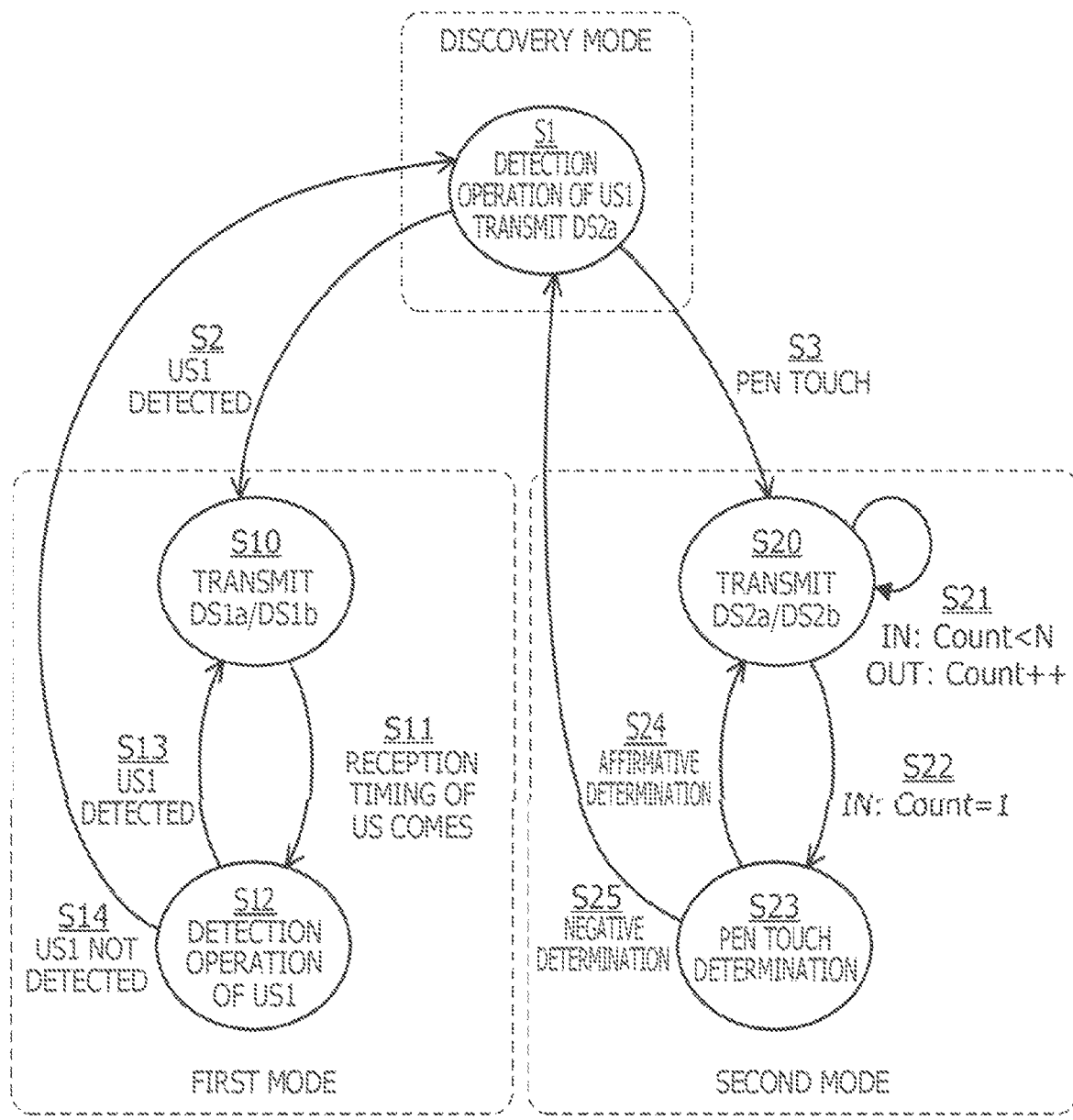
FIG. 2 is a state transition diagram of an integrated circuit illustrated in FIG. 1.

FIG. 2 is a state transition diagram of the integrated circuit 25. As illustrated in FIG. 2, the integrated circuit 25 is configured to operate in one of a discovery mode (first operation mode), a first mode (second operation mode), and a second mode.

The discovery mode is an operation mode of a case in which the integrated circuit 25 has not detected the electronic device 3 yet. The integrated circuit 25 is configured to enter the discovery mode first when the power is turned on. The first and second modes are operation modes for the integrated circuit 25 to communicate with the sensor controller 31 which is supportive of the first and second communication methods, respectively.

In the following description, the uplink signal US used in the first communication method will be referred to as an uplink signal US1 in some cases. Among the downlink signals DS used in the first communication method, the signal transmitted from the pen tip electrode 21 will be referred to as a downlink signal DS1$a$ in some cases, and the signal transmitted from the ring electrode 22 will be referred to as a downlink signal DS1$b$ in some cases. Among the downlink signals DS used in the second communication method, the signal transmitted from the pen tip electrode 21 will be referred to as a downlink signal DS2$a$ in some cases, and the signal transmitted from the ring electrode 22 will be referred to as a downlink signal DS2$b$ in some cases.

The integrated circuit 25 in the discovery mode uses the ring electrode 22 to perform the detection operation of the uplink signal US1 and transmits the downlink signal DS2$a$ from the pen tip electrode 21 (step S1). The detection operation and the transmission are executed at the same time, instead of in a time-division manner.

The integrated circuit 25 that has detected the uplink signal US1 in step S1 enters the first mode (step S2) and starts the communication using the first communication method. Specifically, the integrated circuit 25 first acquires a transmission and reception schedule of the uplink signal US1 and the downlink signals DS1$a$ and DS1$b$ based on the reception timing of the detected uplink signal US1. The integrated circuit 25 then transmits the downlink signals DS1$a$ and DS1$b$ according to the transmission and reception schedule (step S10), and once the reception timing of the uplink signal US1 comes (step S11), the integrated circuit 25 executes the detection operation of the uplink signal US1 (step S12). The transmission in step S10 and the detection operation in step S12 are executed in a time-division manner.

The uplink signal US1 here is a signal modulated with a command indicating an instruction for the active pen 2. Further, the downlink signal DS1$a$ is, for example, a signal including a position signal, which is an unmodulated pulse wave or sine wave, and a data signal modulated with data included in the active pen 2.

The position signal is used by the sensor controller 31 to derive the position of the pen tip of the active pen 2. On the other hand, the data signal is used by the sensor controller 31 to acquire various types of data from the active pen 2. In relation to the data signal, the integrated circuit 25 is configured to acquire the data transmitted by the data signal according to the command included in the uplink signal US1 received from the sensor controller 31. Other than the pen pressure value described above, the data acquired in this way can include a pen ID stored in an internal memory of the integrated circuit 25 and switch information indicating an on/off state of a switch provided on the surface of the active pen 2.

The downlink signal DS1$b$ includes only a position signal that is an unmodulated pulse wave or sine wave. However, the frequency (pulse period) of the pulse wave or the sine wave included in the downlink signal DS1$b$ is different from the frequency of the downlink signal DS1$a$. This is for allowing the sensor controller 31, when receiving signals, to distinguish between the downlink signal DS1$a$ and the downlink signal DS1$b$. The sensor controller 31 derives the position of the ring electrode 22 based on the downlink signal DS1$b$, and derives the distance between the position of the ring electrode 22 and the position of the pen tip derived based on the position signal in the downlink signal DS1$a$ to thereby acquire the tilt of the active pen 2.

If the integrated circuit 25 detects the uplink signal US1 as a result of the execution of the detection operation of the uplink signal US1 in step S12, the integrated circuit 25 maintains the first mode and returns to step S10 to transmit the downlink signals DS1$a$ and DS1$b$ (step S13). On the other hand, if the integrated circuit 25 does not detect the uplink signal US1, the integrated circuit 25 exits the first mode to return to the discovery mode and continues the process (step S14). Note that the integrated circuit 25 may be configured to exit the first mode to return to the discovery mode if the integrated circuit 25 does not detect the uplink signal US1 for a predetermined number of times.

While the integrated circuit 25 is in the discovery mode, the integrated circuit 25 also monitors the pen pressure value. As a result of monitoring, if the integrated circuit 25 detects that the pen pressure value is a value larger than 0, the integrated circuit 25 determines that the pen tip of the active pen 2 has come in contact with the touch surface 3$a$ (pen touch has occurred) and enters the second mode (step S3) to start the communication of the second communication method.

More specifically, the integrated circuit 25 repeatedly transmits the downlink signals DS2$a$ and DS2$b$ (step S20) while increasing a variable Count one at a time (step S21).

The downlink signals DS2$a$ and DS2$b$ here are signals similar to the downlink signals DS1$a$ and DS1$b$. The sensor controller 31 acquires the position and the tilt of the active pen 2 and acquires various types of data from the active pen 2 based on the downlink signals DS2$a$ and DS2$b$ as in the case of the first communication method. However, there is no uplink signal US1, and the sensor controller 31 side cannot request the data to be transmitted by the active pen 2.

If the variable Count reaches a predetermined value N, the integrated circuit 25 returns the variable Count to 1 (step S22) and performs pen touch determination (step S23). The pen touch determination is, in short, an act of determining whether or not the pen pressure value is 0. The integrated circuit 25 determines that the active pen 2 is in the pen touch state if the pen pressure value is not 0 and determines that the active pen 2 is not in the pen touch state (is in the hover state) if the pen pressure value is 0. If the integrated circuit 25 determines that the active pen 2 is in the pen touch state, the integrated circuit 25 maintains the second mode and returns to step S20 to continue transmitting the downlink signals DS2$a$ and DS2$b$ (step S24). On the other hand, if the integrated circuit 25 determines that the active pen 2 is not in the pen touch state, the integrated circuit 25 exits the second mode to return to the discovery mode and continues the process (step S25).

Figure 3:
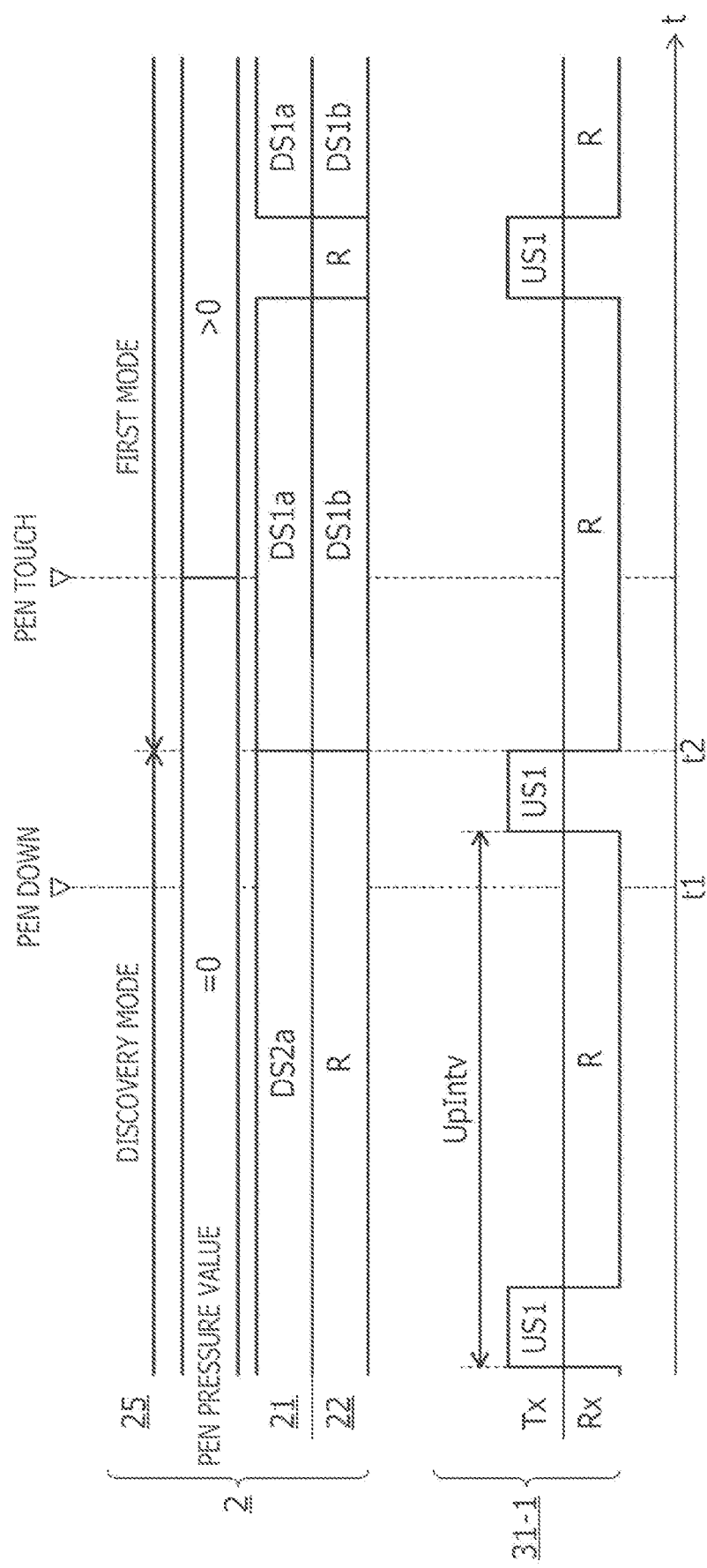
FIG. 3 is a diagram explaining operations of an active pen and a sensor controller in relation to a case in which the sensor controller is a sensor controller supportive of a first communication method.
Figure 4:
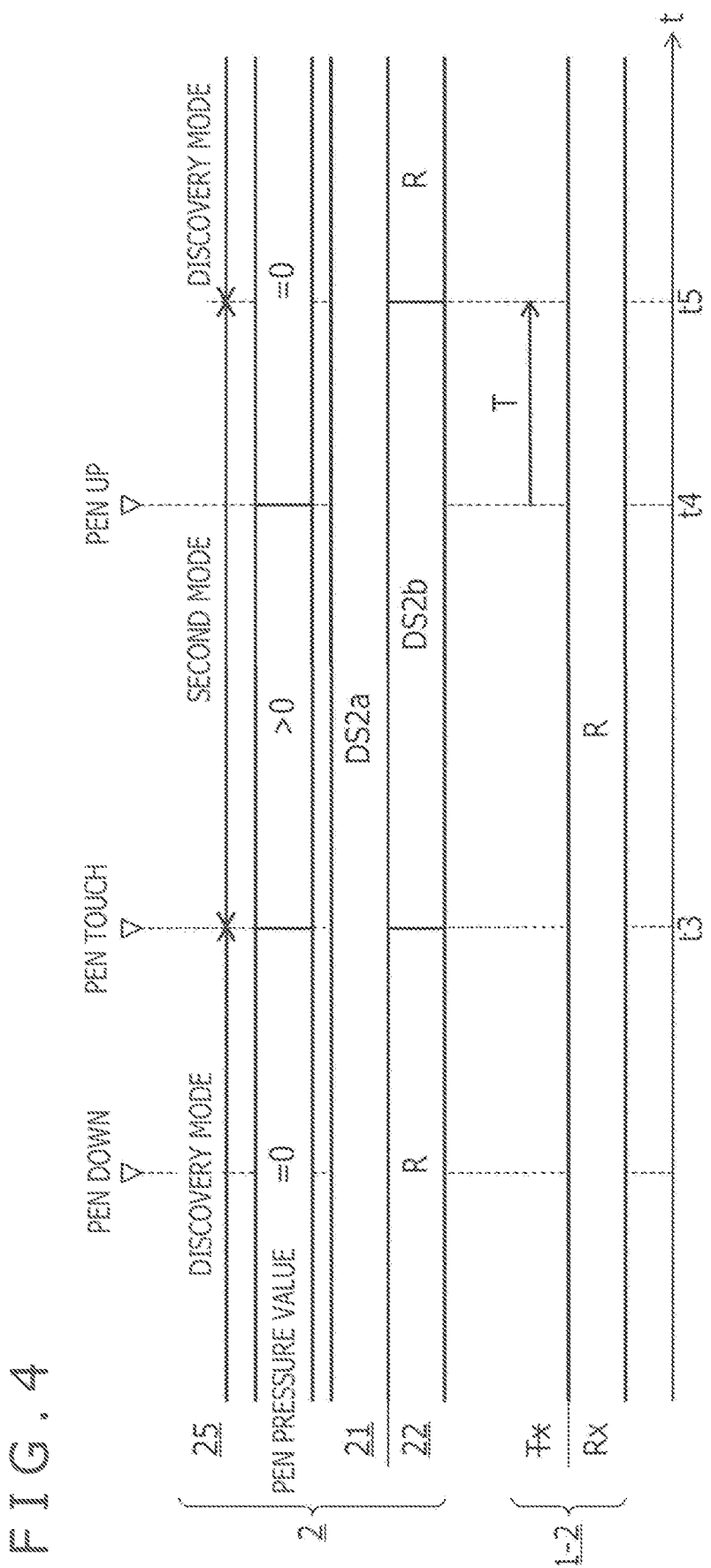
FIG. 4 is a diagram explaining operations of the active pen and the sensor controller in relation to a case in which the sensor controller is a sensor controller supportive of a second communication method.

FIGS. 3 and 4 are diagrams explaining operations of the active pen 2 and the sensor controller 31. A sensor controller 31-1 illustrated in FIG. 3 represents the sensor controller 31 supportive of the first communication method, and a sensor controller 31-2 illustrated in FIG. 3 represents the sensor controller 31 supportive of the second communication method. The operations of the active pen 2 and the sensor controller 31 will now be described in detail again with reference to FIGS. 3 and 4.

Referring first to FIG. 3, the integrated circuit 25 that has not discovered the sensor controller 31 yet is in the discovery mode, and the integrated circuit 25 also detects the uplink signal US1 reaching the ring electrode 22 when the integrated circuit 25 transmits the downlink signal DS2a from the pen tip electrode 21. Note that "R" illustrated in FIG. 3 represents the detection operation (reception operation) of the signal. On the other hand, the sensor controller 31-1 transmits the uplink signal US1 in a predetermined period UpIntv, and when the sensor controller 31-1 is not transmitting the uplink signal US1, the sensor controller 31-1 performs the detection operation of the downlink signals DS 1a and DS1b.

Once the active pen 2 enters a receivable area of the uplink signal US1 at time t1 (pen-down), the integrated circuit 25 receives the uplink signal US1 at the following time t2. The integrated circuit 25 that has received the uplink signal US1 in this way enters the first mode and then repeatedly executes the transmission of the downlink signals DS1a and DS1b and the detection operation of the uplink signal US1 in a time-division manner according to the transmission and reception schedule determined by the reception timing of the uplink signal US1. Although not illustrated in FIG. 3, the integrated circuit 25 returns the operation mode to the discovery mode when the integrated circuit 25 does not receive the uplink signal US1 as a result of performing the detection operation of the uplink signal US1.

Referring to FIG. 4, the integrated circuit 25 that has detected that the pen pressure value has become 0 at time t3 without receiving the uplink signal US1 enters the second mode. The integrated circuit 25 repeatedly transmits the downlink signals DS2a and DS2b while the integrated circuit 25 is in the second mode. Once pen-up occurs at time t4, the integrated circuit 25 exits the second mode to return to the discovery mode at time t5 that is a time period T after time t4. The time length of the time period T is determined by the predetermined value N illustrated in FIG. 2. The integrated circuit 25 continues the second mode without returning to the discovery mode when the state returns to the pen touch state during the time period T.

Next, the stop filter 26 for allowing to execute the detection of the uplink signal US using the ring electrode 22 and the transmission of the downlink signal DS from the pen tip electrode 21 at the same time will be described in detail with reference to the drawings.

Figure 5:
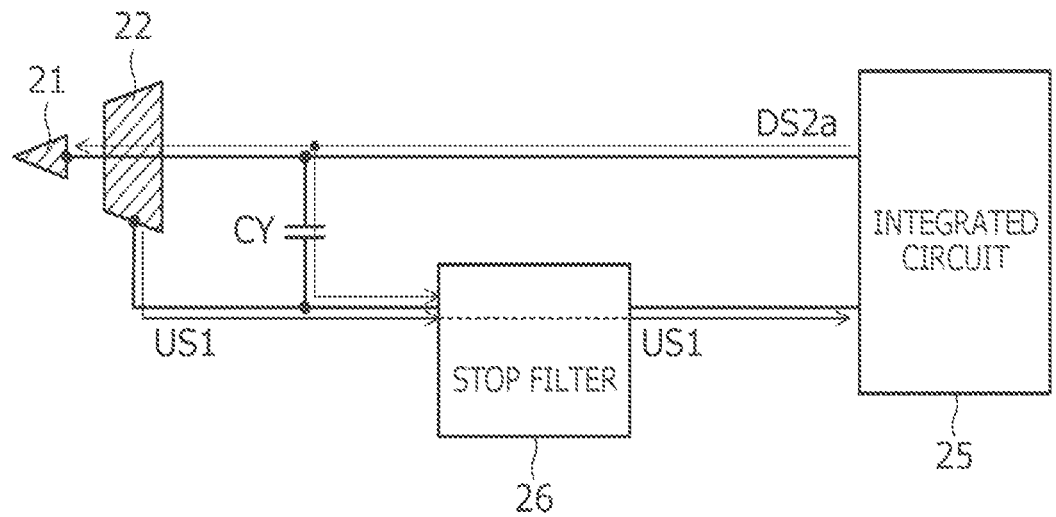
FIG. 5 schematically depicts a configuration in the active pen illustrated in FIG. 1.

FIG. 5 schematically depicts a configuration in the active pen 2. As illustrated in FIG. 5, the stop filter 26 is inserted in a wire connecting the ring electrode 22 and the integrated circuit 25. Therefore, the uplink signal US1 reaching the ring electrode 22 is supplied to the integrated circuit 25 through the stop filter 26.

Capacitance CY illustrated in FIG. 5 represents parasitic capacitance generated between the pen tip electrode 21 as well as the wire connecting the pen tip electrode 21 to the integrated circuit 25, and the ring electrode 22 as well as the wire connecting the ring electrode 22 to the integrated circuit 25. Due to the parasitic capacitance CY, the downlink signal DS2a is superimposed on the uplink signal US1 if the downlink signal DS2a is transmitted from the pen tip electrode 21 when the uplink signal US1 is reaching the ring electrode 22. The stop filter 26 plays a role of removing only the downlink signal DS2a from the uplink signal US1, on which the downlink signal DS2a is superimposed, and supplying only the uplink signal US1 to the integrated circuit 25.

Various configurations can be adopted for the specific configuration of the stop filter 26. Therefore, five types of stop filters 26a to 26e will be illustrated, and each stop filter will be described in detail.

Figure 6:
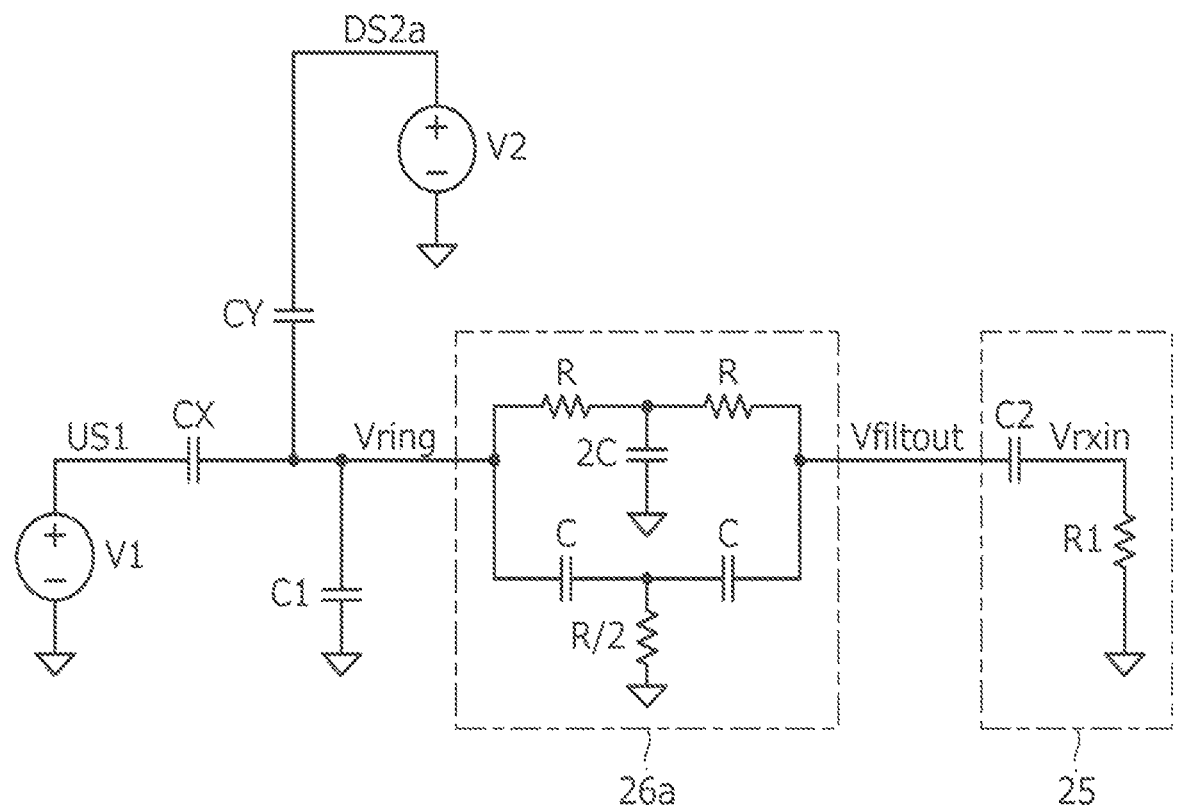
FIG. 6 depicts a configuration of a stop filter as a first example of a stop filter illustrated in FIG. 5.

FIG. 6 depicts a configuration of the stop filter 26a as a first example of the stop filter 26. FIG. 6 illustrates an example of a case in which the downlink signal DS2a includes a signal based on a sine wave at a predetermined frequency. Such a downlink signal DS2a is used in, for example, AES 1.0, and the predetermined frequency in this case is 1.8 MHz.

Figure 10:
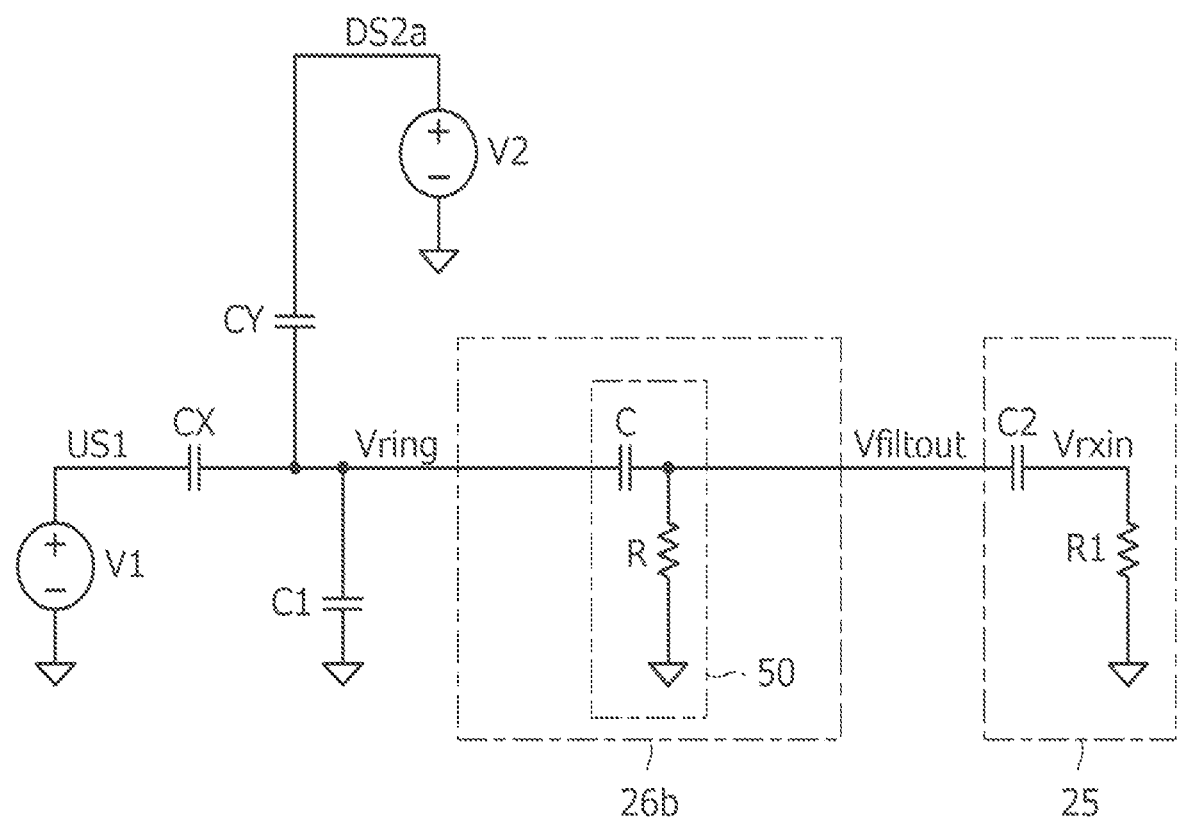
FIG. 10 depicts a configuration of a stop filter as a second example of the stop filter illustrated in FIG. 5.
Figure 13:
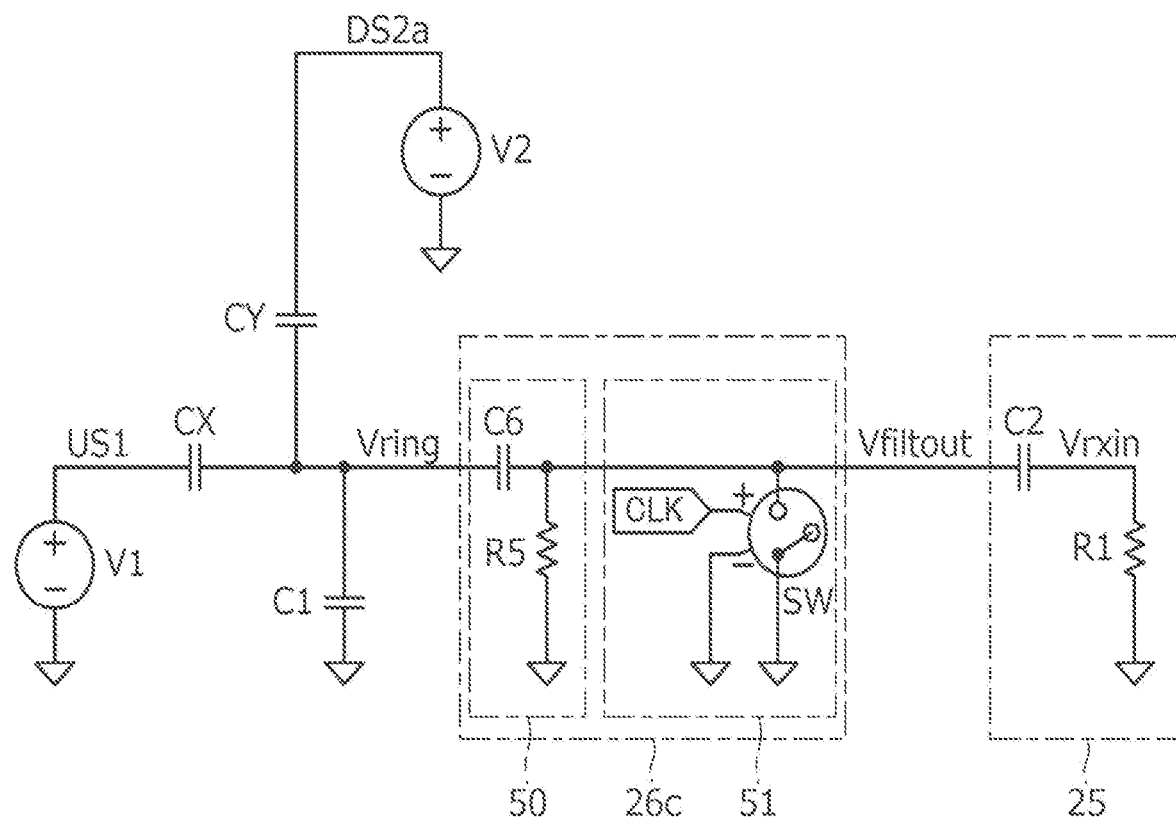
FIG. 13 depicts a configuration of a stop filter as a third example of the stop filter 26 illustrated in FIG. 5.

In FIG. 6 and FIGS. 10 and 13 described later, the configurations of the active pen 2 and the sensor controller 31 are represented by equivalent circuits. Specifically, an oscillator V1 corresponds to the sensor controller 31 and generates the uplink signal US1. An oscillator V2 corresponds to the transmission circuit in the integrated circuit 25 and generates the downlink signal DS2a. The capacitance CX represents the capacitance formed between the ring electrode 22 and the sensor electrode group 30 (see FIG. 1). Capacitance C1 represents capacitance formed between the ring electrode 22 as well as the wire connecting the ring electrode 22 to the integrated circuit 25, and a ground edge. A voltage Vring corresponds to the signal appearing at the ring electrode 22 (the uplink signal US1 on which the downlink signal DS2a is superimposed), and a voltage Vfiltout corresponds to an output signal of the stop filter 26. Although the circuit in the integrated circuit 25 supplied with the voltage Vfiltout is actually the reception circuit, only a series circuit of capacitance C2 and resistance R1 is illustrated in a simplified manner in FIG. 6 and FIGS. 10 and 13 described later. A voltage Vrxin corresponds to a signal received by the reception circuit provided with the voltage Vfiltout.

The stop filter 26a in the example of FIG. 6 includes a band-stop filter (notch filter) that blocks a specific frequency band including the predetermined frequency (carrier frequency of the downlink signal DS2a). More specifically, as illustrated in FIG. 6, the stop filter 26a includes a first circuit including two resistance elements with a resistance value R connected in series, in which the connection point of the two resistance elements is grounded through a capacitor with a capacity value 2C. The stop filter 26a also includes a second circuit including two capacitors with a capacity value C connected in series, in which the connection point of the two capacitors is grounded through a resistance element with a resistance value R/2. The first circuit and the second circuit are connected in parallel between the ring electrode 22 and the integrated circuit 25, and the capacity value C and the resistance value R are set so that a notch frequency $1/2\pi CR$ is equal to the predetermined frequency.

Figure 7:
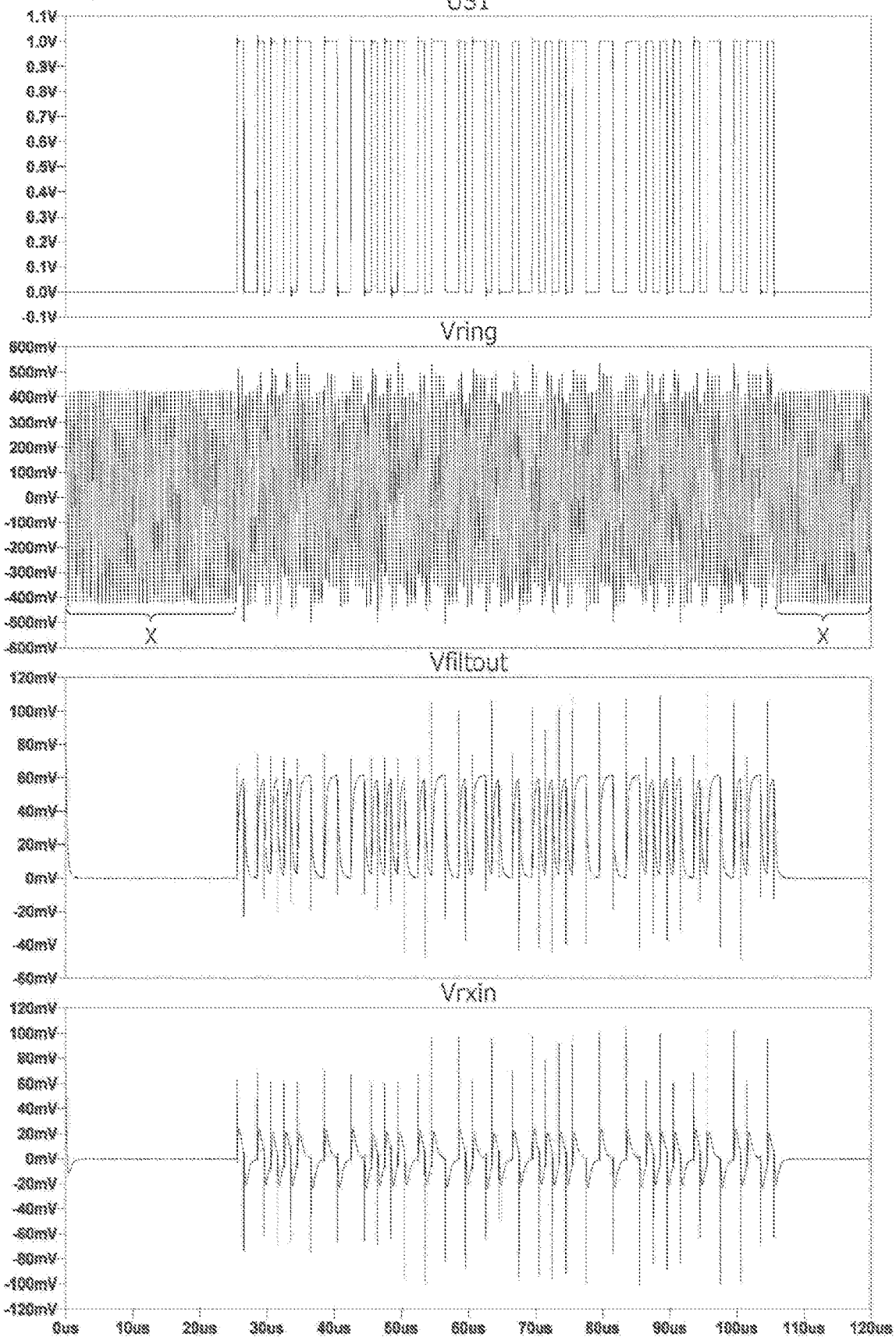
FIG. 7 depicts results of a simulation of signals run by using the configuration of FIG. 6.

FIG. 7 depicts results of a simulation of signals run by using the configuration of FIG. 6. FIG. 7 illustrates the uplink signal US1, the voltage Vring, the voltage Vfiltout, and the voltage Vrxin. In the simulation, the predetermined frequency is 1.8 MHz, and the pulse period of the uplink signal US1 is 2 μsec. The downlink signal DS2a, in the form not superimposed on the uplink signal US1, appears in the illustrated part of a period X in the voltage Vring.

As illustrated in FIG. 7, while the downlink signal DS2a is superimposed on the uplink signal US1 in the voltage Vring, the uplink signal US1 independently appears in the voltages Vfiltout and Vrxin. It can be understood from the results that the stop filter 26a selectively blocks the downlink signal DS2a.

However, as can be understood from FIG. 7, the uplink signal US1 appearing in the voltages Vfiltout and Vrxin is not the original pulse wave but is an edge signal obtained by extracting only the edges of the pulse wave. Therefore, the reception circuit in the integrated circuit 25 needs to be able to receive the uplink signal US1 based on the edge signal. The configuration of the reception circuit configured in this manner will now be described in detail.

Figure 8:
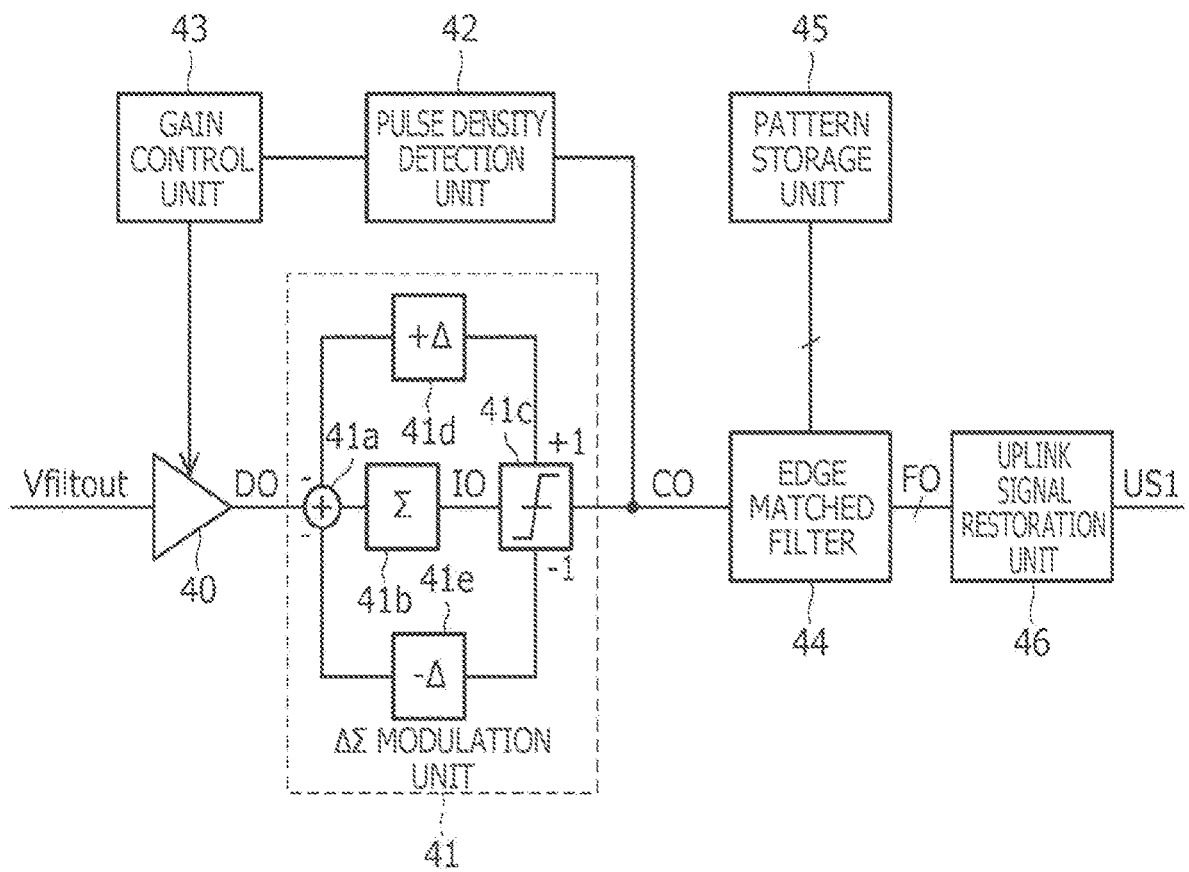
FIG. 8 depicts a configuration of a reception circuit provided in the integrated circuit to receive an uplink signal based on an edge signal obtained by extracting only edges of the uplink signal.

FIG. 8 depicts the configuration of the reception circuit provided in the integrated circuit 25 to receive the uplink signal US1 based on the edge signal. As illustrated in FIG. 8, the integrated circuit 25 in this case includes an amplifier circuit 40, a ΔΣ modulation unit 41, a pulse density detection unit 42, a gain control unit 43, an edge matched filter 44, a pattern storage unit 45, and an uplink signal restoration unit 46.

The amplifier circuit 40 is a circuit that amplifies the voltage Vfiltout output from the stop filter 26a illustrated in FIG. 6 and supplies an output signal DO to the ΔΣ modulation unit 41. The amplifier circuit 40 includes a variable-gain amplifier in which the amplification factor can be controlled by the gain control unit 43.

The ΔΣ modulation unit 41 is a functional unit that uses at least two reference potentials VTP and VTN (VTP=−VTN>0) corresponding to positive and negative, respectively, to perform a comparison for the output signal DO of the amplifier circuit 40 and that executes a feedback process of the comparison result. As illustrated in FIG. 8, the ΔΣ modulation unit 41 includes a subtraction circuit 41a, an addition circuit 41b, a comparison circuit 41c, and delay circuits 41d and 41e.

The comparison circuit 41c is a circuit that compares an output signal IO of the addition circuit 41b and the reference potentials VTP and VTN. The comparison circuit 41c includes three output terminals including an output terminal of a comparison result, a positive-side output terminal (+1), and a negative-side output terminal (−1). A signal output from the output terminal of the comparison result among the output terminals provides an output signal CO of the ΔΣ modulation unit 41.

The operation of the comparison circuit 41c is as follows. When the output signal IO of the addition circuit 41b is higher than the reference potential VTP, the comparison circuit 41c outputs the output signal CO of +1, sets the potential of the positive-side output terminal to High, and sets the potential of the negative-side output terminal to Low. When the output signal IO of the addition circuit 41b is lower than the reference potential VTN, the comparison circuit 41c outputs the output signal CO of −1, sets the potential of the negative-side output terminal to High, and sets the potential of the positive-side output terminal to Low. In other cases, the comparison circuit 41c outputs the output signal CO of 0 and sets the potentials of the positive-side output terminal and the negative-side output terminal to Low. As a result of the operation of the comparison circuit 41c, the output signal CO of the comparison circuit 41c is a ternary pulse signal with a value of one of +1, 0, and −1.

The comparison circuit 41c is configured to operate in a period shorter than the chip length of the chip sequence included in the uplink signal US1. Therefore, the output signal CO is a pulse signal including a plurality of chips (for example, four chips) for each chip of the chip sequence included in the uplink signal US1.

The delay circuit 41d is a circuit that multiplies the potential of the positive-side output terminal of the comparison circuit 41c by Δ and then feeds back the signal to the subtraction circuit 41a after delaying the signal by, for example, one clock (one chip of the output signal CO). Similarly, the delay circuit 41e is a circuit that multiplies the potential of the negative-side output terminal of the comparison circuit 41c by −Δ and then feeds back the signal to the subtraction circuit 41a after delaying the signal by, for example, one clock. It is preferable that the specific value of Δ be a value equal to the reference potential VTP.

The subtraction circuit 41a is a circuit that outputs a signal obtained by subtracting the potential corresponding to the output signals of the delay circuits 41d and 41e from the output signal DO of the amplifier circuit 40. As a result of the subtraction, the potential level of the input signal of the addition circuit 41b drops when the output signal IO of the previous clock is higher than the reference potential VTP, and the potential level of the input signal of the addition circuit 41b rises when the output signal IO of the previous clock is lower than the reference potential VTN. This can obtain an advantageous effect that the potential level of the output signal IO of the addition circuit 41b can be limited in a certain range.

The addition circuit 41b is a circuit that outputs a signal obtained by integrating the output signals of the subtraction circuit 41a. The output signal IO of the addition circuit 41b is obtained by adding the output signal of the subtraction circuit 41a to the output signal of the addition circuit 41b of the previous clock.

The pulse density detection unit 42 is a functional unit that detects the pulse density of the output signal CO of the ΔΣ modulation unit 41 and that notifies the gain control unit 43 of the result. The gain control unit 43 plays a role of controlling the gain of the amplifier circuit 40 based on the pulse density notified from the pulse density detection unit 42 to thereby prevent the output signal CO from being fixed due to the absolute value of the output signal DO becoming too large or too small.

The pattern storage unit 45 includes a storage circuit that stores, as a known pattern, a ternary chip sequence including a plurality of chips with values of +1, 0, or 1, for each of a plurality of spreading codes (binary chip sequence) that can be used by the sensor controller 31 to transmit the uplink signal US.

The edge matched filter 44 includes a first-in first-out shift register that can store a chip sequence equivalent to the number of chips corresponding to one spreading code. Every time the edge matched filter 44 acquires one chip of the output signal CO of the ΔΣ modulation unit 41, the edge matched filter 44 stores the chip in the shift register. Every time the edge matched filter 44 stores one new chip, the edge matched filter 44 calculates a correlation between the chip sequence stored in the shift register at that point and each of a plurality of known patterns stored in the pattern storage unit 45. The edge matched filter 44 sequentially supplies the results as an output signal FO to the uplink signal restoration unit 46.

The uplink signal restoration unit 46 determines that the spreading code corresponding to the pattern used to calculate the output signal FO is detected when the output signal FO is equal to or greater than a predetermined value. The uplink signal restoration unit 46 then restores the uplink signal US1 based on the spreading codes detected one after another. The integrated circuit 25 demodulates the uplink signal US restored in this way to receive the command transmitted by the sensor controller 31.

Figure 9A:
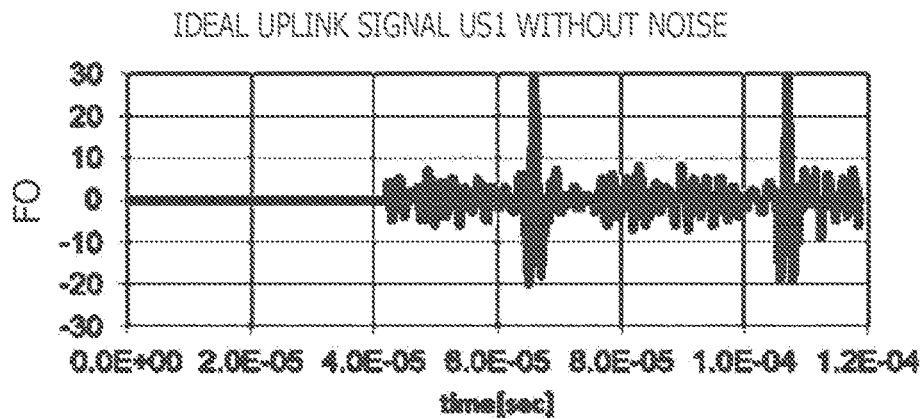
FIGS. 9A-9C depict an example of an output signal FO generated by the reception circuit illustrated in FIG. 8.
Figure 9B:
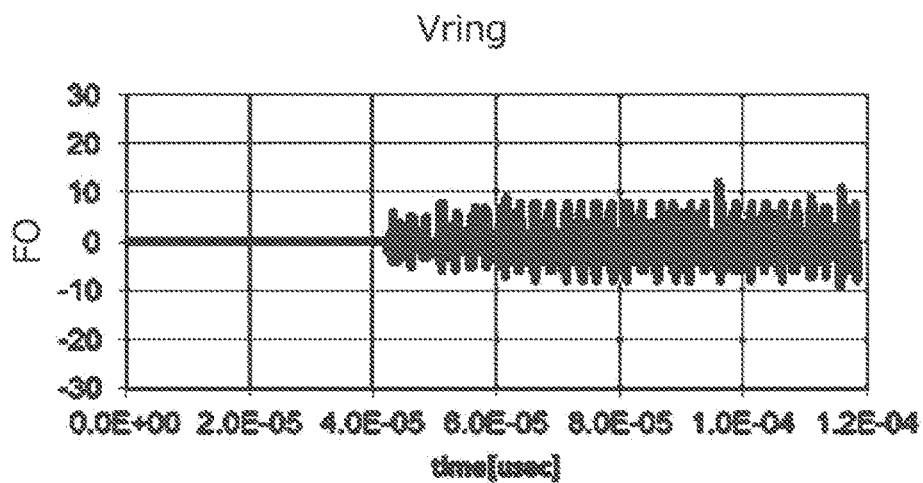
Figure 9C:
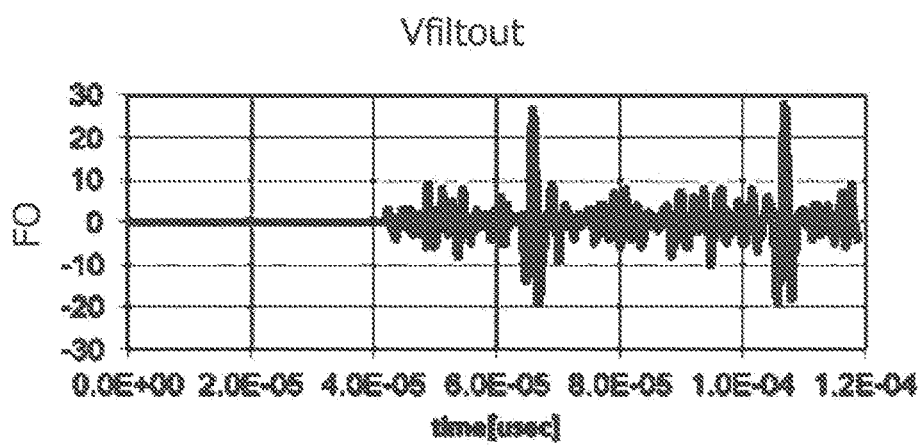

FIGS. 9A-9C depict an example of the output signal FO generated by the reception circuit illustrated in FIG. 8. FIGS. 9A-9C illustrate a case in which the correlation is calculated by using a pattern corresponding to the chip sequence of the received uplink signal US1. FIG. 9C illustrates a case in which the voltage Vfiltout is input to the reception circuit. For comparison, FIG. 9A illustrates a case in which an ideal uplink signal US without noise is input to the reception circuit, and FIG. 9B illustrates a case in which the voltage Vring is input to the reception circuit. It can be understood from the results illustrated in FIGS. 9A-9C that by combining the stop filter 26a illustrated in FIG. 6 and the reception circuit illustrated in FIG. 8, the uplink signal US1 can be correctly received as in the case where the ideal uplink signal US without noise is input to the reception circuit.

FIG. 10 depicts a configuration of the stop filter 26b as a second example of the stop filter 26. FIG. 10 illustrates an example of a case in which the downlink signal DS2a includes a pulse wave. However, compared to the uplink signal US1 that is also a pulse wave, the pulse period of the downlink signal DS2a is significantly longer, and the time length of the edge period is also longer. Specifically, the pulse wave is, for example, 4 μsec to 40 μsec, and the edge period is, for example, 100 nsec to 5 μsec.

The stop filter 26b includes a high-pass filter 50 configured to pass the pulse wave (first pulse wave) of the uplink signal US1 and block the pulse wave (second pulse wave) of the downlink signal DS2a. Specifically, as illustrated in FIG. 10, it is preferable that the high-pass filter 50 include, for example, a CR filter including a capacitor with the capacity value C, in which one end is connected to the ring electrode 22, and the other end is connected to the integrated circuit 25, and a resistance element with the resistance value R connected between the other end of the capacitor and the ground edge. The capacity value C and the resistance value R are set so that the stop filter 26b passes the uplink signal US1 and blocks the downlink signal DS2a.

Figure 11:
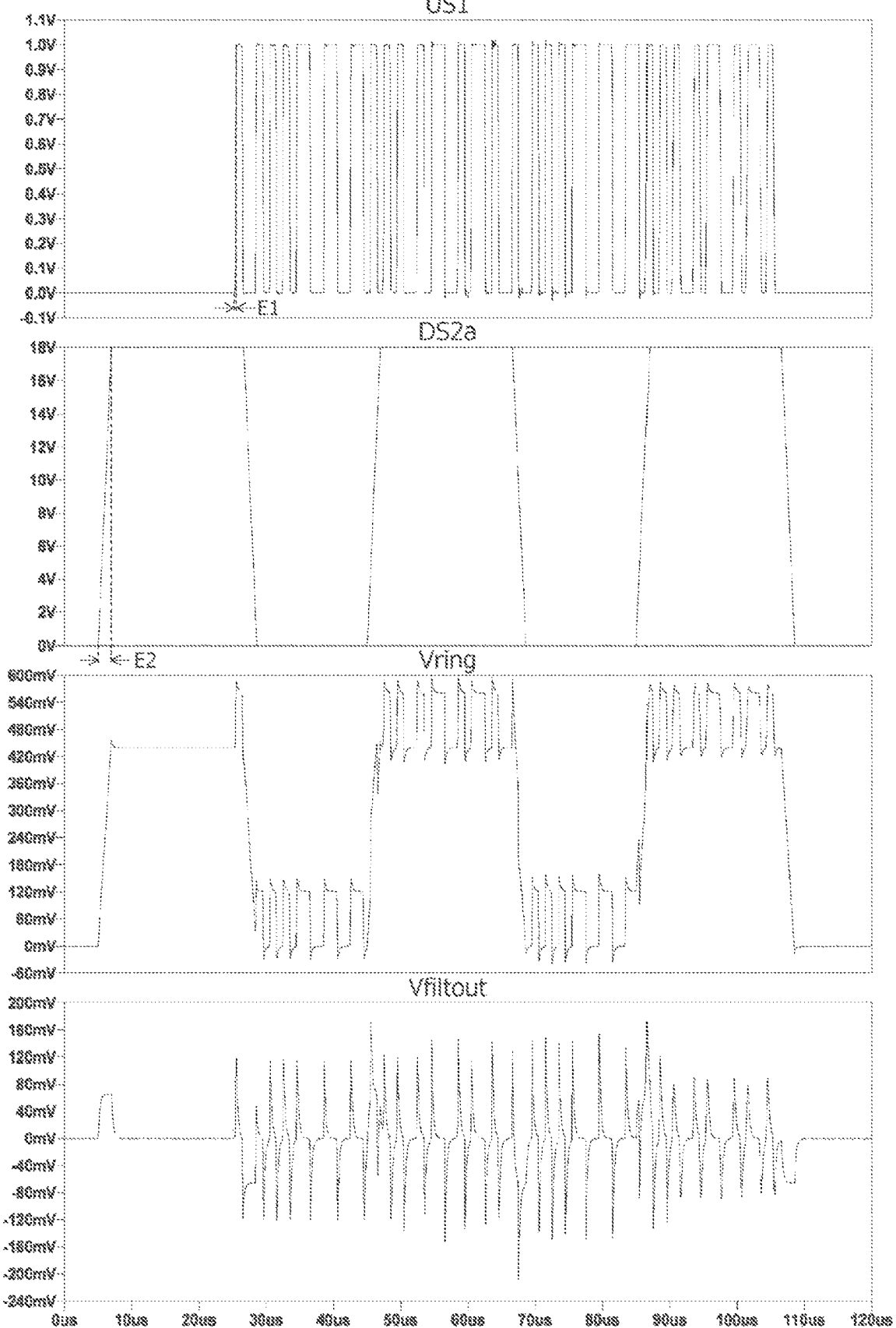
FIG. 11 depicts results of a simulation of signals run by using the configuration of FIG. 10.

FIG. 11 depicts results of a simulation of signals run by using the configuration of FIG. 10. FIG. 11 illustrates the uplink signal US1, the downlink signal DS2a, the voltage Vring, and the voltage Vfiltout. In the example of FIG. 11, the pulse period of the uplink signal US1 is 2 μsec, and the pulse period of the downlink signal DS2a is 40 μsec. The time length of an edge period E1 of the uplink signal US1 is 10 nsec, and the time length of an edge period E2 of the downlink signal DS2a is 2 μsec.

As illustrated in FIG. 11, the downlink signal DS2a is superimposed on the uplink signal US1 in the voltage Vring, and the downlink signal DS2a has substantially disappeared in the voltage Vfiltout. It can be understood from the results that the stop filter 26b also selectively blocks the downlink signal DS2a. However, in the example of FIG. 11, the uplink signal US1 appearing in the voltage Vfiltout is not the original pulse wave but is an edge signal obtained by extracting only the edges of the pulse wave. Therefore, it is preferable that the reception circuit in the integrated circuit 25 be the reception circuit with the configuration described with reference to FIG. 8, as in the first example.

In the case of using the stop filter 26b with the configuration illustrated in FIG. 10, it may be difficult to remove the downlink signal DS2a from the voltage Vring if the difference between the time length of the edge period E2 of the downlink signal DS2a and the time length of the edge period E1 of the uplink signal US1 is small. A specific example will be described.

Figure 12:
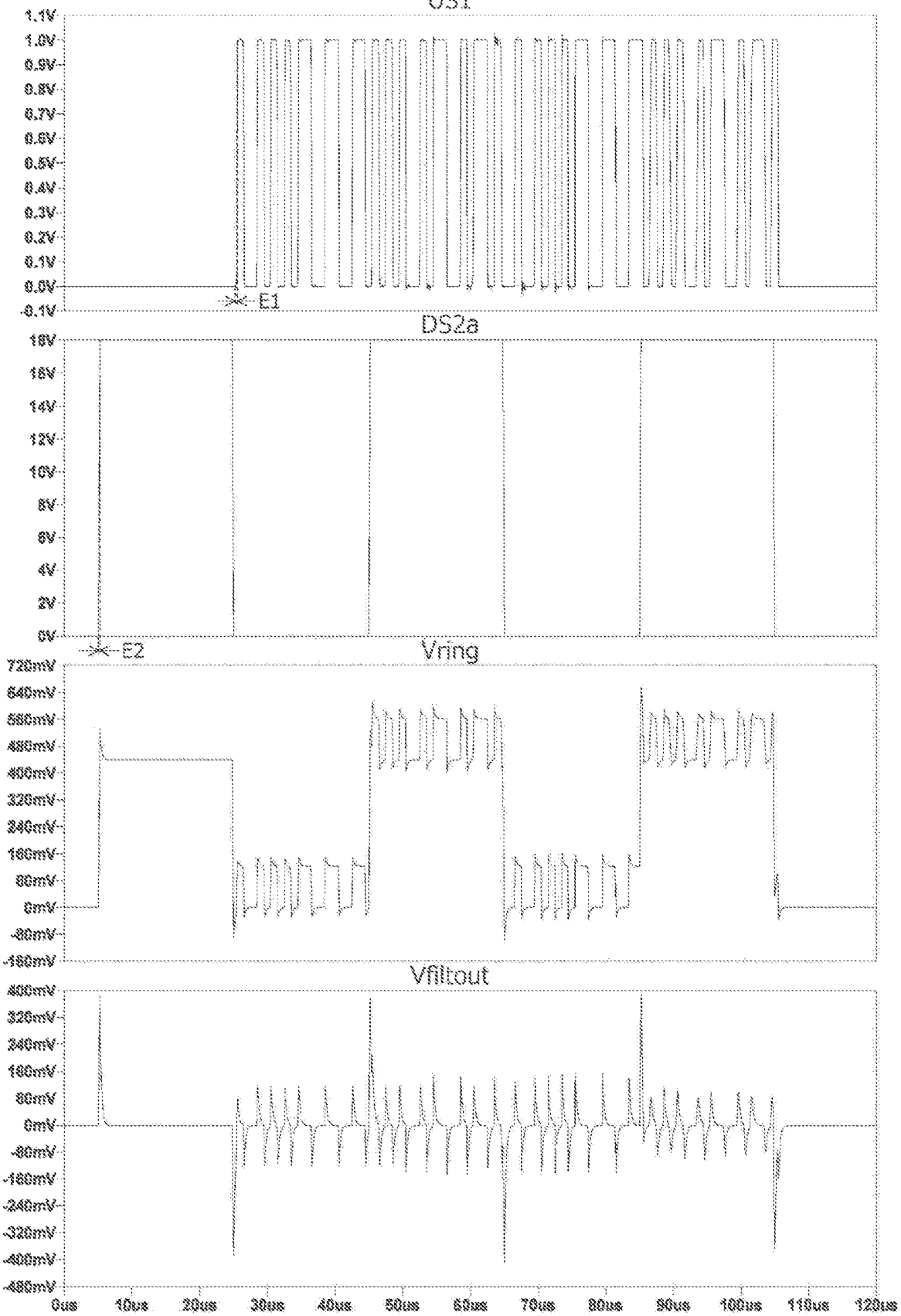
FIG. 12 depicts results of a simulation of signals run by using the configuration of FIG. 10.

FIG. 12 depicts results of a simulation of signals run by using the configuration of FIG. 10 as in FIG. 11. The difference from FIG. 11 is that the time length of the edge period E2 of the downlink signal DS2a is 200 nsec. As illustrated in FIG. 12, edges of the downlink signal DS2a clearly remain in the voltage Vfiltout in this case.

FIG. 13 depicts a configuration of the stop filter 26c as a third example of the stop filter 26. The stop filter 26c can be used to solve the problem of the stop filter 26b. The details will now be described.

The stop filter 26c includes a mute circuit 51 on a back stage of the high-pass filter 50 illustrated in FIG. 10. The mute circuit 51 includes a switch element SW and a clock circuit CLK connected between the other end of the capacitor of the high-pass filter 50 and the ground edge. The switch element SW includes a non-inverting input terminal and an inverting input terminal. The switch element SW grounds the output end of the stop filter 26c when the difference between the potential of the non-inverting input terminal and the potential of the inverting input terminal is equal to or greater than a predetermined value, and the switch element SW does not ground the output end otherwise. Further, the clock circuit CLK is configured to output a signal that is High in edge periods of the downlink signal DS2a and that is Low in other periods. The clock circuit CLK supplies the signal to the non-inverting input terminal of the switch element SW. The operation of the switch element SW and the clock circuit CLK mutes the output (=voltage Vfiltout) of the stop filter 26c in the edge periods of the downlink signal DS2a.

Figure 14:
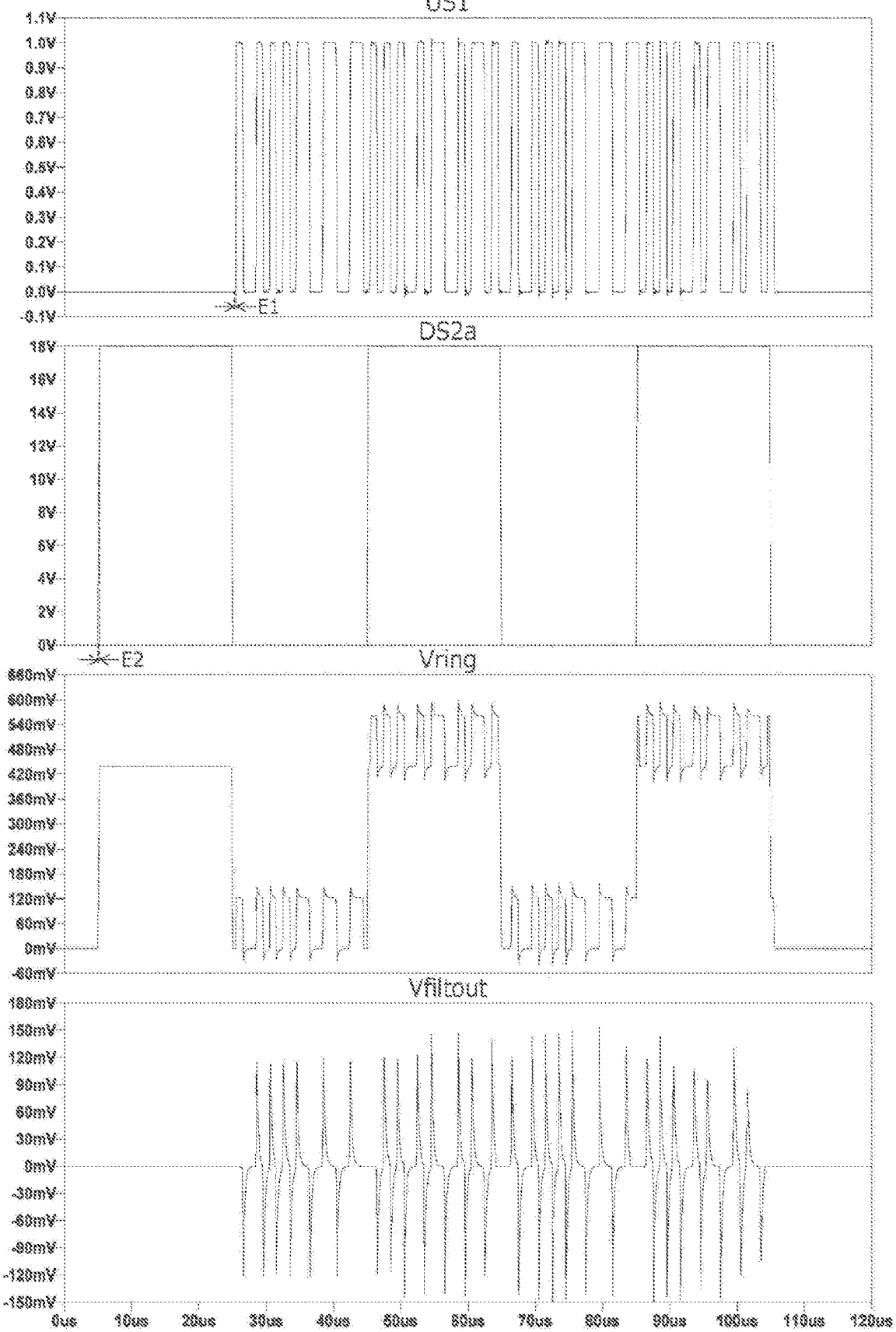
FIG. 14 depicts results of a simulation of signals run by using the configuration of FIG. 13.

FIG. 14 depicts results of a simulation of signals run by using the configuration of FIG. 13. The waveforms of the uplink signal US1 and the downlink signal DS2a are similar to the waveforms in the example of FIG. 12. As can be understood by comparing FIG. 14 and FIG. 12, the edges of the downlink signal DS2a have disappeared from the voltage Vfiltout in the example of FIG. 14. It can be understood from the results that the mute circuit 51 plays a role of removing the downlink signal DS2a from the voltage Vring.

Here, part of the pulse of the uplink signal US1 may be lost when the mute circuit 51 is used. Therefore, as in the first and second examples, it is also preferable in the third example that the reception circuit in the integrated circuit 25 be the reception circuit with the configuration described with reference to FIG. 8. In this way, the correlation calculation by the edge matched filter 44 can restore the uplink signal US1, and the uplink signal US1 can be correctly received even if the pulse of the uplink signal US1 is lost a little due to the action of the mute circuit 51.

Figure 15:
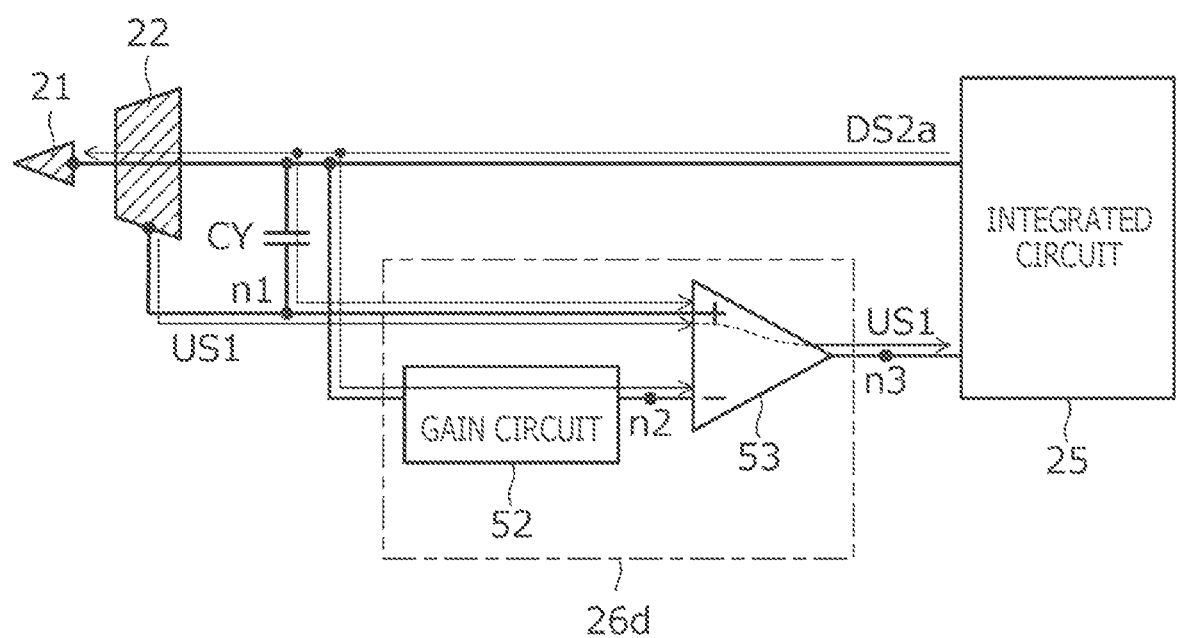
FIG. 15 depicts a configuration of a stop filter as a fourth example of the stop filter illustrated in FIG. 5.

FIG. 15 depicts a configuration of the stop filter 26d as a fourth example of the stop filter 26. As illustrated in FIG. 15, the stop filter 26d includes a gain circuit 52 and a differential circuit 53.

The gain circuit 52 is a circuit that outputs the downlink signal DS2a after controlling the amplitude of the downlink signal DS2a. The input end of the gain circuit 52 is connected to the output end of the transmission circuit in the integrated circuit 25, and the output end is connected to the inverting input terminal of the differential circuit 53. The gain circuit 52 plays a role of attenuating the amplitude of the downlink signal DS2a to a level equivalent to the amplitude of the downlink signal DS2a superimposed on the uplink signal US1 through the parasitic capacitance CY.

The differential circuit 53 is a circuit that outputs a signal after subtracting the output signal of the gain circuit 52 from the uplink signal US1 reaching the ring electrode 22. The non-inverting input terminal of the differential circuit 53 is connected to the ring electrode 22, and therefore, the uplink signal US1, on which the downlink signal DS2a is superimposed through the parasitic capacitance CY, is input to the non-inverting input terminal of the differential circuit 53. As described above, the output signal of the gain circuit 52 is the downlink signal DS2a with the amplitude attenuated to the level equivalent to the amplitude of the downlink signal DS2a superimposed on the uplink signal US1, and therefore, the output signal of the differential circuit 53 is the uplink signal US1 on which the downlink signal DS2a is not superimposed.

Figure 16A:
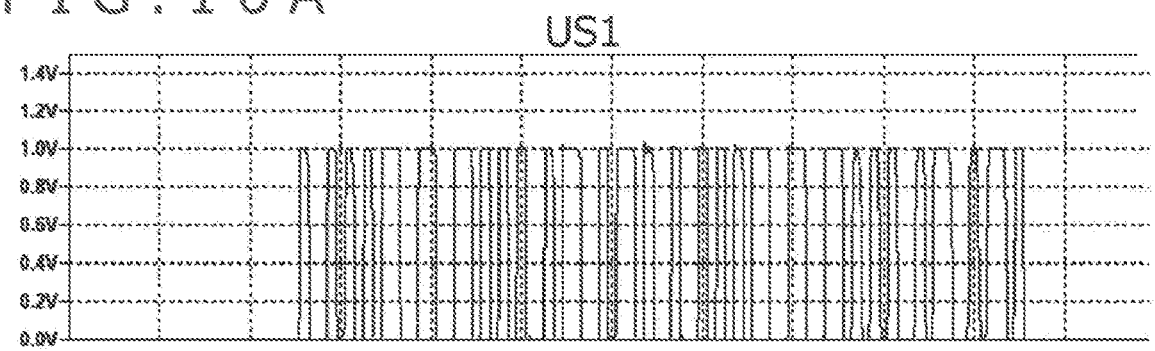
FIGS. 16A-16D depict results of a simulation of signals run by using the configuration of FIG. 15.
Figure 16B:
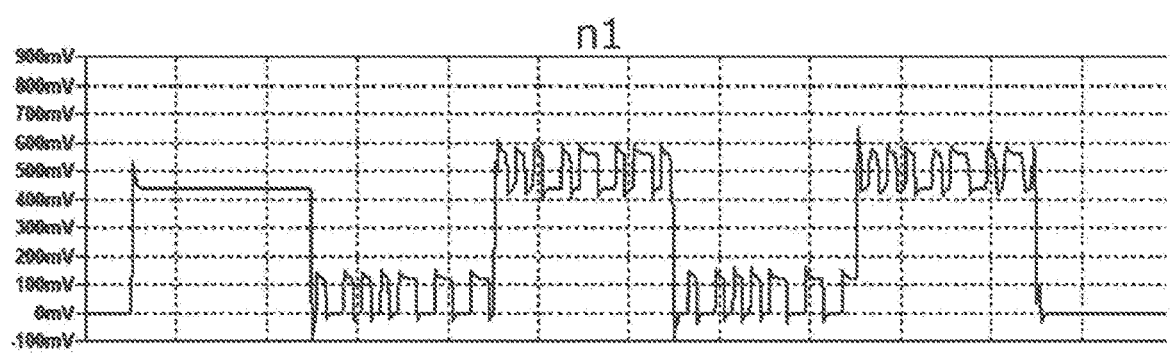
Figure 16C:
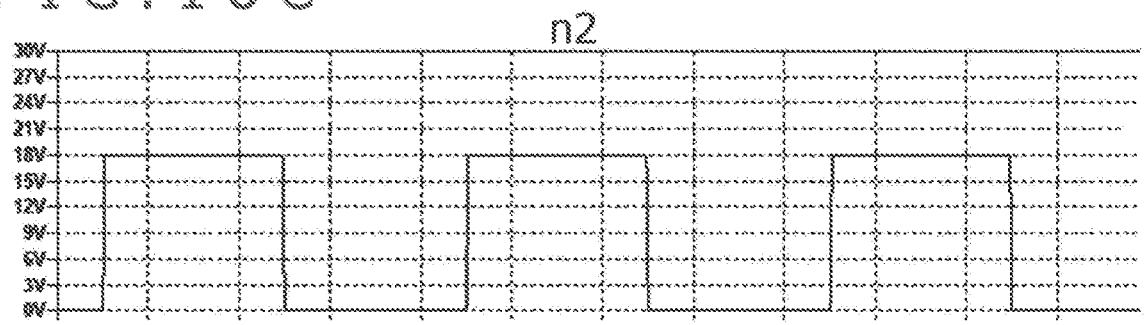
Figure 16D:
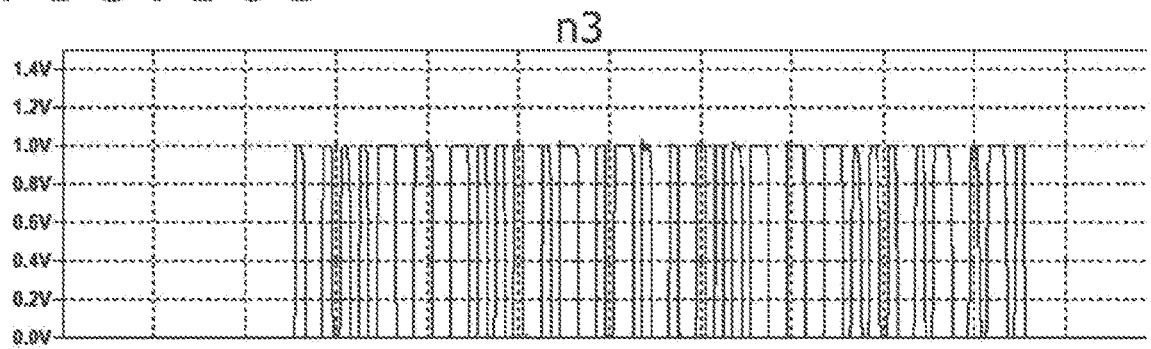

FIGS. 16A-16D depict results of a simulation of signals run by using the configuration of FIG. 15. FIG. 16A illustrates the uplink signal US1 generated by the sensor controller 31, and FIGS. 16B to 16D illustrate signals appearing in nodes n1 to n3, respectively, illustrated in FIG. 15. Note that FIGS. 16A-16D illustrate an example, in which both of the uplink signal US1 and the downlink signal DS2a include pulse waves, and the pulse period of the downlink signal DS2a is significantly longer than the pulse period of the uplink signal US1.

As can be understood from FIGS. 16A-16D, the signal appearing in the node n1 is a signal in which the uplink signal US1 generated by the sensor controller 31 and the downlink signal DS2a appearing in the node n2 are superimposed. The signal appearing in the node n3 is a signal with a waveform similar to the waveform of the original uplink signal US1 as a result of the removal of the downlink signal DS2a appearing in the node n2 from the signal appearing in the node n1. It can be understood from the results that the stop filter 26d plays a role of removing the downlink signal DS2a from the signal reaching the ring electrode 22.

Although not taken into account in the example of FIGS. 15 and 16, the uplink signal US1 coming around toward the pen tip electrode 21 through the parasitic capacitance CY is superimposed on the actual input of the gain circuit 52. The components of the uplink signal US1 need to be removed from the downlink signal DS2a in the stop filter 26 when the influence of the superimposition cannot be ignored. In a fifth example described next, the stop filter 26 that allows the removal will be described.

Figure 17:
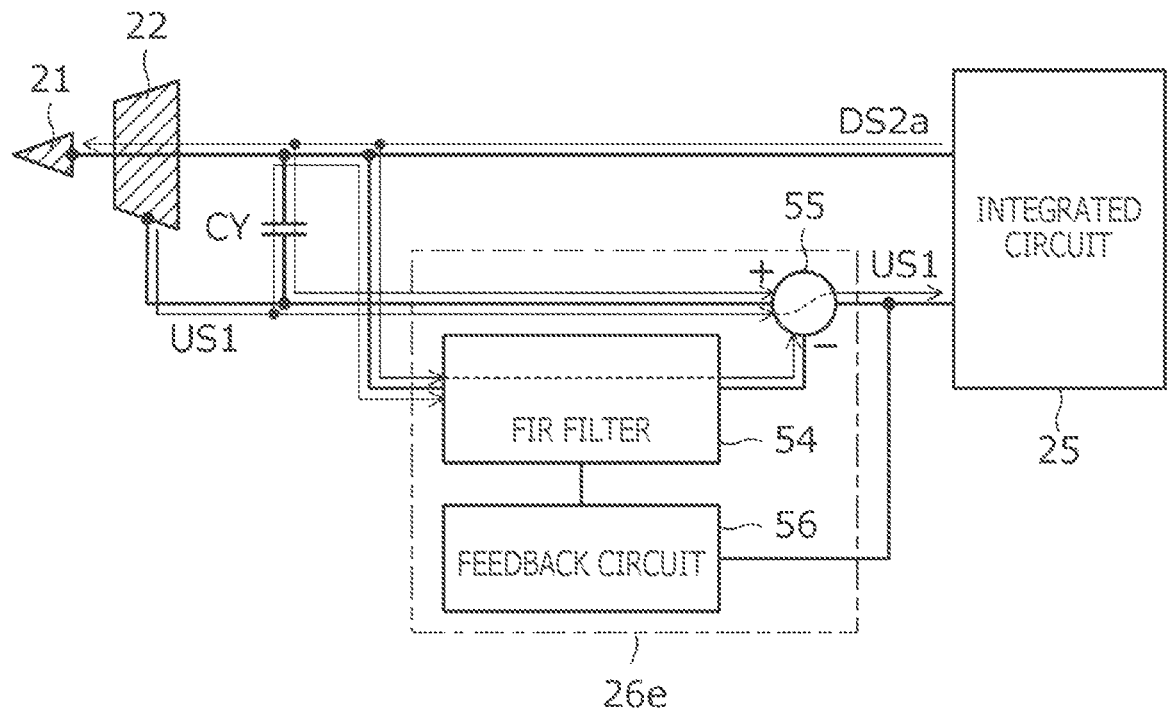
FIG. 17 depicts a configuration of a stop filter as a fifth example of the stop filter illustrated in FIG. 5.

FIG. 17 depicts a configuration of the stop filter 26e as a fifth example of the stop filter 26. As illustrated in FIG. 17, the stop filter 26e includes a finite impulse response (FIR) filter 54, a subtractor 55, and a feedback circuit 56.

The FIR filter 54 is a digital filter configured to extract only specific signal components. The FIR filter 54 in the stop filter 26e plays a role as a filter circuit that removes the components of the uplink signal US1 from the downlink signal DS2a output from the transmission circuit in the integrated circuit 25 and plays a role as a gain circuit that outputs the downlink signal DS2a after controlling the amplitude of the downlink signal DS2a. Similar to the differential circuit 53 illustrated in FIG. 15, the subtractor 55 is a differential circuit that outputs a signal after subtracting the output signal of the FIR filter 54 from the uplink signal US1 reaching the ring electrode 22.

The feedback circuit 56 is a circuit that controls the control amount of the amplitude of the downlink signal DS2a by the FIR filter 54 to reduce the amplitude of the output signal of the subtractor 55 (that is, to reduce the output energy). Specifically, it is preferable to use a least mean squares (LMS) algorithm to control the value of each coefficient included in the transfer function of the FIR filter 54. As a result of the control by the feedback circuit 56, the signal output from the FIR filter 54 is a signal close to a pure downlink signal DS2a not including the components of the uplink signal US1. Therefore, according to the stop filter 26e, the downlink signal DS2a can be effectively removed from the signal reaching the ring electrode 22 even if the uplink signal US1 is superimposed on the input of the FIR filter 54 through the parasitic capacitance CY.

As described above, according to the active pen 2 of the present embodiments, the stop filter 26 is provided between the ring electrode 22 and the integrated circuit 25, and therefore, the reception of the uplink signal US1 and the transmission of the downlink signal DS2a can be performed at the same time, instead of in a time-division manner. Therefore, this can prevent a delay in the reception of the uplink signal US1.

Furthermore, according to the active pen 2 of the present embodiments, the reception of the uplink signal US and the transmission of the downlink signal DS can be performed at the same time in the stage (discovery mode) in which the sensor controller 31 is not detected yet and the transmission timing of the uplink signal US transmitted by the sensor controller 31 is not recognized. On the other hand, the reception of the uplink signal US and the transmission of the downlink signal DS can be performed in a time-division manner in the stage (first mode) in which the uplink signal US is detected and the transmission timing of the uplink signal US transmitted by the sensor controller 31 is recognized. Therefore, the delay in the reception of the uplink signal US can be prevented, and once the uplink signal US is detected, the uplink signal US with a small amount of noise can be detected. Furthermore, the downlink signals DS can be transmitted from both of the pen tip electrode 21 and the ring electrode 22, and therefore, the tilt of the active pen 2 can be used.

Although the preferred embodiments of the present invention have been described, the present invention is not limited to the embodiments in any way, and it is obvious that the present invention can be carried out in various modes without departing from the scope of the present invention.

For example, although the case of using the uplink signal US1 that is a pulse signal has been illustrated and described in the embodiments, the present invention can also be advantageously applied to a case of using the uplink signal US including a signal based on a sine wave. In a case of using the stop filter 26a illustrated in FIG. 6 in this case, the uplink signal US can be a signal based on a sine wave at a frequency not included in the specific frequency band blocked by the stop filter 26a.

Furthermore, although the example of fixing and inserting the stop filter 26 between the ring electrode 22 and the integrated circuit 25 has been described in the embodiments, a first route that goes through the stop filter 26, a second route that does not go through the stop filter 26, and a switch for switching the routes may be provided. The integrated circuit 25 may control the switch to validate the first route in the case where the detection operation of the uplink signal US1 and the transmission of the downlink signal DS2a are performed at the same time (discovery mode) and validate the second route in other cases (first and second modes).

Furthermore, although the example of applying the present invention to the active pen 2 that is a dual-mode stylus has been described in the embodiments, the present invention can be widely applied to the active pen 2 that needs to transmit the downlink signal DS and receive the uplink signal US at the same time.

What is claimed is:

1. An active pen comprising:
an integrated circuit that transmits a downlink signal through a first electrode and receives an uplink signal through a second electrode different from the first electrode; and
a stop filter inserted between the second electrode and the integrated circuit,
wherein the integrated circuit, in operation, performs transmission of the downlink signal and the reception of the uplink signal at the same time.

2. The active pen according to claim 1, wherein control circuit increases a potential of the first electrode with a booster circuit.

3. The active pen according to claim 1, wherein the stop filter blocks a specific frequency band.

4. The active pen according to claim 1, wherein
the uplink signal is a first pulse wave,
the downlink signal is a second pulse wave in which a time length of an edge period is different from the first pulse wave, and
the stop filter is a high-pass filter configured to pass the first pulse wave and block the second pulse wave.

5. The active pen according to claim 1, wherein
the uplink signal and the downlink signal are pulse waves, and
the stop filter includes
a high-pass filter configured to pass the pulse wave included in the uplink signal and block the pulse wave included in the downlink signal, and
a mute circuit that mutes an input of the uplink signal to the integrated circuit in an edge period of the downlink signal.

6. The active pen according to claim 5, wherein
the mute circuit is provided between the high-pass filter and the integrated circuit.

7. The active pen according to claim 5, wherein
the integrated circuit is configured to receive the uplink signal based on correlation calculation.

8. The active pen according to claim 1, wherein
the stop filter includes
a gain circuit that outputs the downlink signal after controlling an amplitude of the downlink signal, and
a differential circuit that outputs a signal after subtracting the output signal of the gain circuit from the uplink signal reaching the second electrode.

9. The active pen according to claim 8, wherein
the stop filter further includes a feedback circuit that controls a control amount of the amplitude of the downlink signal by the gain circuit to reduce an amplitude of the output signal of the differential circuit.

10. The active pen according to claim 1, wherein the first electrode is a pen tip electrode, and the second electrode is a ring electrode.

11. The active pen according to claim 1, wherein
the downlink signal is a signal at a predetermined frequency, and
the stop filter is a band-stop filter that blocks a specific frequency band including the predetermined frequency.

* * * * *